Aug. 25, 1942.        J. W. WILKINSON        2,294,262
FILTER CARTRIDGE GASKET
Filed Oct. 3, 1939
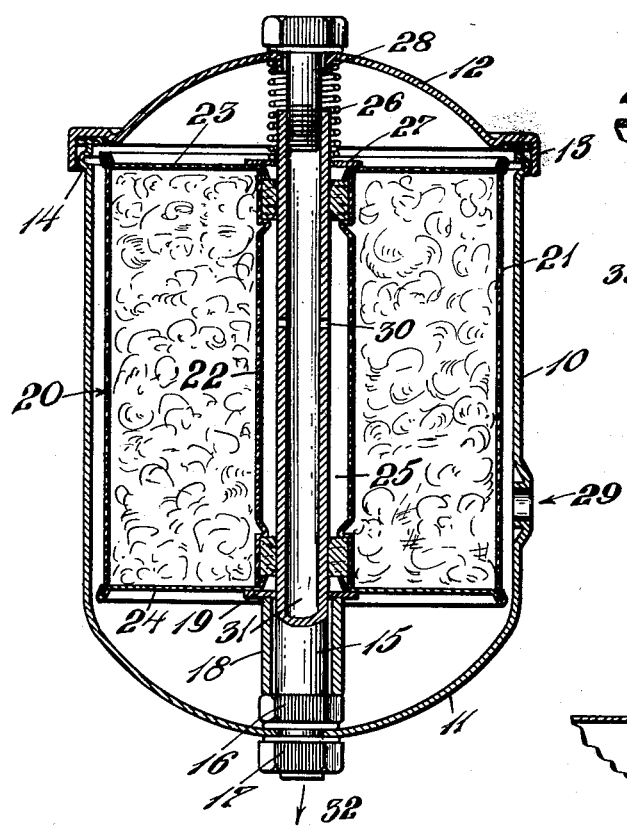
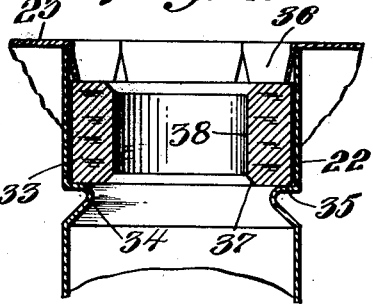
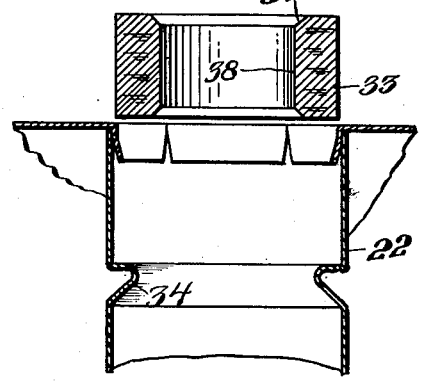
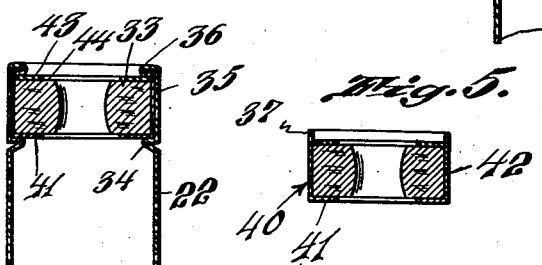
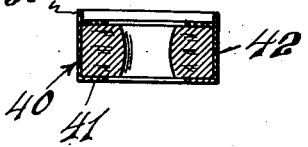
INVENTOR.
James W. Wilkinson
BY Barlow & Barlow
ATTORNEYS.

Patented Aug. 25, 1942

2,294,262

UNITED STATES PATENT OFFICE 2,294,262

FILTER CARTRIDGE GASKET

James W. Wilkinson, Providence, R. I., assignor to Fram Corporation, a corporation of Rhode Island Application October 3, 1939, Serial No. 297,714

10 Claims. (Cl. 210—131)

This invention relates to a filter, more particularly of the type designed for filtering the crank case oil of an internal combustion engine such as for an automobile and has for one of its objects the provision of a plug type of gasket, making unnecessary the holding of an open center cartridge in any definite location on a center tube of a housing casing.

Another object of this invention is to provide a replacement cartridge for a filter casing other than that designed particularly for the cartridge so that a tight seal may be made for directing the oil flow in the filter.

Another object of this invention is to dispense with the use of adapters where the cartridge height differs from that of the original cartridge which was designed for the casing.

Another object of the invention is to dispense with the use of springs or other mechanical means which necessitate the holding of cartridge on a flat seating gasket.

Another object of the invention is to definitely lock the plug type gasket so that it may be carried by the cartridge and removed with the cartridge when the cartridge is to be removed from the casing.

Another object of this invention is to make unnecessary the reaching into a casing to remove the bottom gasket of a cartridge when a used cartridge is withdrawn prior to the insertion of a new cartridge in position.

Another object of the invention is to facilitate the removal of the gasket.

With these and other objects in view, the invention consists of certain novel features of construction, as will be more fully described, and particularly pointed out in the appended claims.

In the accompanying drawing:

Fig. 1 is a sectional view through a cartridge and its casing with the plug type gasket in position.

Fig. 2 is a fragmental sectional view on a greatly enlarged scale with reference to that shown in Fig. 1 illustrating the plug type gasket in its working position in the cartridge.

Fig. 3 is a view similar to Fig. 2 showing a plug type gasket about to be inserted into the cartridge.

Fig. 4 is a sectional view of a modified form of gasket mounting.

Fig. 5 is a sectional view of a portion of the structure of Fig. 4.

In the use of removable cartridges in casings having a central tube, it is usual that the axial opening through the cartridge through which the tube of the casing extends be sealed adjacent either end by flat gaskets which engage the end walls of the cartridge about the tube, while a spring is used for seating these gaskets and the cartridge at their ends. Variations in the length of the cartridge cause the tight fit of these gaskets to be uncertain and sometimes such that the seal will not at all occur, thus making necessary the using of a casing and cartridge which are of predetermined design for fitting together almost essential. By this arrangement which I have provided cartridges varying in length may be utilized and the use of cartridges in casings which were not designed to fit the cartridge may readily occur, it being only necessary to vary the size of the plug gasket used. Further, gaskets sometimes stick to the center tube, making their removal difficult, and to obviate this I impregnate the gasket with wax or the like; and the following is a more detailed description of the present embodiment of this invention, illustrating the preferred means by which these advantageous results may be accomplished:

In reference to the drawing 10 designates the side wall of a casing having a bulging bottom 11 and a removable cover 12 with a flange 13 to fit the beaded edge 14 of the casing. Within this casing extending upwardly from the bulbous bottom 11, there is a central tube 15 secured in place by nuts 16 and 17 in a known manner. A collar 18 surrounds the tube and supports a washer 19 which fits about the tube and rests upon this collar.

A cartridge designated generally 20 consists of a cylindrical shell having perforated outer wall at 21 and a perforated central tube 22 forming a structure annular in cross section with a closed end 23 at the top and a closed end 24 at the bottom. The casing tube 15 extends through the opening 25 provided by the perforated tube 22. A spring 26 which fits about the collar 28 on the cover engages washer 27 and forces the cartridge downwardly into the position such as shown in Fig. 1.

It is desirable that the oil to be filtered enter the casing through the opening 29, where it spreads out between the cartridge and the casing and then flows radially inwardly through cartridge 20 entering at the perforated wall 21 and flowing out through the perforated wall 22 to thence enter the opening 30 in the tube 15 to discharge downwardly and outwardly through the center 31 of the tube 15 as at 32 from the filter. In order that the liquid not enter the space 25 between the ends of the cartridge except after it has passed through the cartridge, sealing gaskets 33 are provided which are of some resilient nature such as cork and are firmly held adjacent to the end of the cartridge in some suitable manner.

In order that this gasket may be held in desired position I have provided an abutment 34 which consists of inwardly deflecting the stock of the tube 22 so as to provide a seat for the gasket as at 35. This exists adjacent both ends of the cartridge. The top wall 23 of the cartridge has fingers 36 extending into the tube 22 and also centrally inwardly from the tube 22. The gasket 33 is of a dimension such that when inserted through the opening it will bend, spreading the fingers as it passes by them and the fingers will then snap inwardly after the gasket passes, so as to prevent withdrawal of the gasket from the cartridge.

The gasket will be beveled at its edges as at 37 so that after assembled on a cartridge it may be slipped over the tube 15 to be compressed by reason of its inherent spongy nature so as to firmly engage the tube 22 at its outer circumference and firmly engage the tube 15 at its inner wall 38. By this arrangement the gasket is firmly held in the cartridge and provides an effective seal about the tube 15. Various size gaskets may be provided for accommodating various center tubes or cartridges.

In Figs. 4 and 5, a modified arrangement is illustrated. A cylindrical member 40 having a bottom lip 41 and cylindrical side walls 42 is inserted with a press fit into the tube 22 and may rest upon a shoulder 34, although this shoulder may not be essential, or the same may be welded as at 35 with or without the shoulder to maintain the same in place. The upper edge 36 of the tube 22 together with the upper edge 37 of the member 40 are rolled together so as to provide a seal which will be liquid-tight to prevent any filtered liquid from exuding between the wall 42 and the tube 22. This lip 41 supports the gasket 33 while a metal washer 43 will rest upon the top face 44 of the gasket and be held firmly thereagainst by the rolling inwardly of the portions 36 and 37 which form a liquid-tight seal.

By this arrangement, the gasket is supported on its top and bottom faces and confined between the lip 41 and the washer 43 so that any compression of this gasket will be radial with respect to the axis of the center tube or the axis of the cartridge, and thus there will be a very firm engagement of the gasket with the center tube to prevent passage of liquid past the center tube. The gasket will be well beveled on its edges, as heretofore mentioned, for the reception of the center tube, as previously mentioned.

In order to prevent the gasket from sticking to the center tube which sometimes makes the removal of the gasket difficult, I treat or impregnate the gasket with paraffin wax or some substance which will enable the gasket to slide on the center tube. This substance also serves to protect the gasket from ageing in the air and from dust and impurities and also serves to increase the life of the gasket in use.

Various materials will effectively serve the purpose of the gasket, such as synthetic rubber, which is not attacked by oil; but I have found that cork, which is relatively low in cost, is satisfactory and in the present price market the most desirable.

The foregoing description is directed solely towards the construction illustrated, but I desire it to be understood that I reserve the privilege of resorting to all the mechanical changes to which the device is susceptible.

I claim:

1. In a filter, a casing having inlet and outlet openings, a cartridge therein of annular formation with perforate concentric cylindrical walls providing a longitudinal central opening therethrough formed by a cylindrical wall, a central tube in said opening extending through said cartridge and communicating with one of said openings in the casing, resilient plugs located within and adjacent the ends of said central opening and about said tube to centrally space said tube in said opening of the cartridge and block the flow of liquid through the central opening, means on the inner cylindrical wall about said opening to lock the plugs positively with reference thereto, said tube being provided with an opening intermediate said plugs.

2. In a filter, a casing having inlet and outlet openings, a cartridge therein of annular formation with perforate concentric cylindrical walls providing a longitudinal central opening therethrough formed by a cylindrical wall, a central tube in said opening extending through said cartridge and communicating with one of said openings in the casing, resilient plugs located within and adjacent the ends of said central opening and about said tube to centrally space said tube in said opening of the cartridge and block the flow of liquid through the central opening, resilient means on the inner cylindrical wall about said opening to lock the plugs positively with reference thereto, said tube being provided with an opening intermediate said plugs.

3. In a filter, a casing having inlet and outlet openings, a cartridge therein of annular formation with perforate concentric cylindrical walls providing a longitudinal central opening therethrough formed by a cylindrical wall, a central tube in said opening extending through said cartridge and communicating with one of said openings in the casing, resilient plugs located within and adjacent the ends of said central opening and about said tube to centrally space said tube in said opening of the cartridge and block the flow of liquid through the central opening, means on the wall about said opening and formed from the stock of said wall to lock the plugs positively with reference thereto, said tube being provided with an opening intermediate said plugs.

4. In a filter, a casing having inlet and outlet openings, a central tube extending longitudinally thereof and communicating with one of the openings in the casing, a cartridge having a central opening formed by a perforate cylindrical wall and receiving said tube, and an annular plug to centrally space said tube in said central opening, said plug being held under radial compression between said tube and wall to block passage of the liquid to be filtered, and means on said wall to engage the opposite ends of said plug to direct its expansion radially.

5. In a filter, a casing having inlet and outlet openings, a filtering cartridge housed within said casing, said cartridge comprising a cylindrical shell of annular cross-section with inner and outer perforate concentric cylindrical walls closed at their opposite ends, said inner cylindrical wall providing a longitudinal central opening through the cartridge, an abutment on the inner wall forming said central opening located near to each end thereof and extending radially inwardly of said opening, a central tube extending through said central opening of the cartridge and communicating with one of said openings in the casing, and resilient plugs about said tube located within and adjacent the ends of the central opening, said plugs being supported at their inner ends by said abutments and firmly engaging said tube and said inner wall of the cartridge to centrally space the tube in said central opening of the cartridge and prevent endwise flow of liquid through said central opening from the space between said tube and said inner wall, and means on the inner cylindrical wall about the ends of said central opening coacting with the outer ends of said plugs to lock them in said opening, said tube being provided with an opening intermediate said plugs.

6. In a filter, a casing having inlet and outlet openings, a filtering cartridge housed within said casing, said cartridge comprising a cylindrical shell of annular cross-section with inner and outer perforate concentric cylindrical walls closed at their opposite ends, said inner cylindrical wall providing a longitudinal central opening through the cartridge, an abutment on the inner wall forming said central opening located near to each end thereof and extending radially inwardly of said opening, a central tube extending through said central opening of the cartridge and communicating with one of said openings in the casing, and resilient plugs about said tube located within and adjacent the ends of said central opening, said plugs being supported at their inner ends by said abutments and firmly engaging said tube and said inner wall of the cartridge to centrally space the tube in said central opening of the cartridge and prevent endwise flow of liquid through said central opening from the space between said tube and said inner wall, and resilient means on the inner cylindrical wall about the ends of said central opening to permit the insertion of said plugs into said opening and coacting with the outer ends of the plugs to lock them in said opening against said abutments, said tube being provided with an opening intermediate said plugs.

7. In a filter, a casing having inlet and outlet openings, a filtering cartridge housed within said casing, said cartridge comprising a cylindrical shell of annular cross-section with inner and outer perforate concentric cylindrical walls closed at their opposite ends, said inner cylindrical wall providing a longitudinal central opening through the cartridge, an abutment on the inner wall forming said central opening located near to each end thereof and extending radially inwardly of said opening, a central tube extending through said central opening of the cartridge and communicating with one of said openings in the casing, and resilient plugs about said tube located within and adjacent the ends of said central opening, said plugs being supported at their inner ends by said abutments and firmly engaging said tube and said inner wall of the cartridge to centrally space the tube in said central opening of the cartridge and prevent endwise flow of liquid through said central opening from the space between said tube and said inner wall, and resilient means formed from the stock of the wall providing said central opening and arranged about the ends of said central opening to permit the insertion of said plugs into said opening and coacting with the outer ends of the plugs to lock them in said opening against said abutments, said tube being provided with an opening intermediate said plugs.

8. In a filter, a casing having an inlet and an outlet, a central tube extending longitudinally of said casing and communicating with either said inlet or said outlet, a cartridge containing filtering material and having an inner rigid perforate cylindrical wall providing a central opening in the cartridge receiving said tube in spaced relationship thereto, an annular resilient plug within and adjacent one end of said central opening and about said tube to centrally space said tube in said opening, said plug engaging the exterior of said tube and the inner cylindrical surface of the wall of the central opening of said cartridge, and being of such radial dimension when free from stress as to be held under radial compression when positioned between said tube and said wall to seal and prevent endwise flow of liquid from the annular space between said tube and said wall, and means carried by the cartridge and located in adjacency to the inner cylindrical wall about said opening and extending inwardly of said wall to engage and lock said plug in said cartridge and coacting with the outer end of said plug to direct its expansion radially, and means adjacent the opposite end of the cartridge for sealing the space between the tubular wall and the center tube.

9. In a filter, a casing having an inlet and an outlet, a central perforated tube extending longitudinally of said casing and communicating with either said inlet or said outlet, a cartridge containing filtering material and having an inner rigid perforate tubular wall providing a central opening in the cartridge receiving said tube in spaced relationship thereto, an annular resilient plug within said tubular wall and adjacent one end of the cartridge centrally spacing said tube in said central opening, said plug being of a dimension to be held under radial compression between said tube and said inner wall to block endwise passage of liquid from the annular space between said tube and said wall, annular means at right angles to the axis of said tubular wall engaging one end of said plug, and means on the wall about said opening and extending inwardly thereof from one end for coacting with said annular means that engages the outer end of said plug to direct its radial expansion radially and lock the plug in said cartridge, and means adjacent the opposite end of the cartridge for sealing the space between the tubular wall land the center tube.

10. In a filter, a casing having inlet and outlet openings, a central tube extending longitudinally thereof and communicating with one of said openings in the casing, a cartridge having a central opening formed by a perforate cylindrical wall and receiving said tube in spaced relationship thereto, an annular plug to centrally space said tube in said central opening, said plug being held under radial compression between said tube and wall to block passage of the liquid endwise from the annular space between said tube and said wall, an annular lip extending from the inner surface of said cylindrical wall to engage and support the inner end of the plug, a washer within said central opening engaging the outer end of said plug, said ends of the plug being snugly engaged by said lip and said washer to direct the expansion of said plug radially and form a liquid-tight seal between said tube and wall, and means on said inner wall about said central opening and extending inwardly thereof from one end in coacting relationship with said washer to lock the plug in said cartridge.

JAMES W. WILKINSON.